United States Patent Office 3,026,308
Patented Mar. 20, 1962

3,026,308
SUSPENSION POLYMERIZATION UTILIZING PHOSPHORUS COMPOUNDS AS SUSPENDING AGENTS
James J. Kearney, North Madison, Ohio, assignor to Diamond Alkali Company, Cleveland, Ohio, a corporation of Delaware
No Drawing. Filed Sept. 23, 1957, Ser. No. 685,388
10 Claims. (Cl. 260—92.8)

This invention relates to the production of synthetic resins and more particularly to suspension polymerization of monoethylenic monomers, especially polyvinyl chloride.

In recent years, suspension or granular polymerization wherein no emulsion is formed and polymer particles settle rapidly upon discontinuance of agitation, has gained widespread acceptance in the plastics industry with, in some instances, a corresponding decline in the use of emulsion polymerization. This has come about because of certain difficulties inherent in polymers formed via emulsion polymerization. Among these difficulties often are high impurity content, poor dielectric properties, as well as increased production costs caused by the difficulty of washing the precipitated polymer free of the emulsifying agent or agents employed and the precipitation agent, required to separate the product from the stable emulsion in which it is formed.

On the other hand, resins prepared by suspension polymerization have a low impurity content and good dielectric properties. Moreover, since the suspension polymer is formed in a granular state, no precipitation agent need be added and the expensive washing steps involved in treatment of polymer from emulsion polymerization are thus eliminated. On the contrary, simple filtration and/or centrifugation is sufficient to recover the desired product. Although suspension polymerization has proved superior to emulsion polymerization, the polymer thus produced heretofore at times has some properties which, in some applications are undesirable.

Most notable of these, perhaps, is the occurrence of defects, known in the art as "fish eyes," in products which are processed from the suspension polymers. These fish eyes, constituting small blotches having the appearance of the eyes of a fish comprise small particles of polymer surrounded by relatively large seas of plasticizer, are believed to result from the failure of some of the individual particles of polymer to associate with the plasticizer. Since the plasticized material is intended to be homogeneous, these defects indicate poor homogeneity and constitute imperfections in the final product. Although small numbers of fish eyes can be tolerated, since at present it has proved difficult to eliminate them completely, a substantial number gives a product having a rough surface, with its clarity degraded to translucency, which product generally also has greatly reduced dielectric and structural strength.

Although a suspension polymer is easily washed free of impurities without the many repeated washings which are necessary to purify an emulsion polymer, in the past it has proved difficult to obtain a polymer having a uniform particle size whereby this ease of washing may be attained. It can readily be seen, that in removing impurities from the polymer by filtering or centrifuging, when the polymer contains large quantities of very fine particles, the separation will be extremely slow and difficult, if not impossible, as this mass of small particles will tend to hold occluded impurities, or may themselves pass through a filter. Moreover, if the particles of the polymer are too large, or are not uniformly of a desired size, the additional working of the polymer which is required when it is processed, will cause a deterioration of the polymer, thus yielding an inferior product. It is, therefore, extremely desirable to be able consistently to produce a polymer characterized by a uniform particle size.

It has been found that when the proper suspension system is used, a polymer is consistently produced having uniform particles of a desired size, which polymer may be formed into products having a minimum number of fish eyes. In addition, when the proper suspension system is used, the polymer particles have a uniform plasticizer absorption rate, as well as good colloidability, the term "colloidability" referring to the ease with which the polymer particles will accept plasticizer and homogenize into a uniform mass during processing. It is not intended to infer that there are no optimum reaction rates, temperature limits and conditions of agitation at which the suspension polymerization should be carried out, for this is not the case. Rather, it is intended, as is indicated hereinafter in some detail, that the optimum values mentioned above are correlated with the proper suspension system, thus producing a superior polymerized product.

It is, therefore, a principal object of this invention to produce a polymerized resin having particles of a uniform optimum size, said particles having good colloidability and plasticizer absorption.

Another object of this invention is to produce a polymerized resin having particles with the above characteristics, by suspension polymerization.

A further object of this invention is to provide a suspension system for use in the method of suspension polymerization which will produce a polymerized resin having the above characteristics.

These and other objects and advantages of the invention will become apparent to those skilled in the art from the description which follows.

Although the invention is not restricted to the polymerization of a single monomeric material, for purposes of simplicity the invention will be described with respect to its application to the production of polyvinyl chloride. It is, however, understood that the present invention may advantageously be used in the production of differing polymeric resins from various polymerizable ethylenic monomers or mixtures thereof, as, for example, polyvinyl chloride-containing copolymers, and especially copolymers in which vinyl chloride constitutes at least 85% by weight of the mixture of the monomeric materials employed.

The process of the present invention may thus be applied to processes wherein vinyl chloride is polymerized with other polymerizable monoethylenic monomers, such as vinyl esters of carboxylic acids, for example, vinyl acetate, vinyl propiate, vinyl butyrate or vinyl benzoate; esters of unsaturated acids, for example, methyl acrylate, ethyl acrylate, butyl acrylate, and the corresponding esters of methacrylic acid; vinyl aromatic compounds, for example, styrene, orthochloro styrene, parachloro styrene, 2,5-dichloro styrene, 2,4-dichloro styrene, paraethyl styrene, divinyl benzene, vinyl naphthalene, alphamethyl styrene; dienes, such as butadiene, chloroprene; amides, such as acrylic acid amide, acrylic acid analide; nitriles, such as acrylonitrile; esters of alpha, beta-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like.

The process of the invention is also applicable to vinyl halides broadly, e.g., vinyl chloride, vinyl bromide, and the like, vinyl chloride being a preferred monomer as previously indicated.

In the past, many suspending agents have been used in producing synthetic resins and particularly polyvinyl chloride by suspension polymerization. Included among these are methyl cellulose, polyvinyl alcohol, sodium alginates, gum tragacanth and similar compounds. However, it has been found in the practice of this invention, that a polymer having the desired characteristics, i.e., particles of a uniform, optimum size, having good plasticizer absorption and colloidability, which polymer may be processed into a product substantially free from "fish eyes," can be produced by varrying out the polymerization in an aqueous medium containing a small amount of gelatin as a suspending agent, in combination with an organic phosphorus compound, especially an aliphatic phosphorus compound embodying at least one alkyl substituent, desirably selected from the group consisting of organic phosphonates, organic phosphites, and phosphinic acid. It has been found that about 90% or more of the particles of polyvinyl chloride so produced will pass through a screen having 100 openings per lineal inch and remain on a screen having 200 openings per lineal inch, this being a typical optimum particle size, and representing an excellent particle size distribution.

Among the organic phosphites which may be used are di-2-ethyl hexyl hydrogen phosphite, tributyl phosphite, trihexyl phosphite, tricresyl phosphite, triisoctyl phosphite, and tri-2-ethyl hexyl phosphite. Illustrative of suitable organic phosphonates are bis-(2-ethyl hexyl)-2-ethyl hexyl phosphonate and, as indicated, phosphinic acid itself. Although any of the above may be used in the practice of the invention, particularly good results have been obtained by using di-2-ethyl hexyl hydrogen phosphite, bis-(2-ethyl hexyl)-2-ethyl hexyl phosphonate, or a mixture of these two compounds.

Although the use of gelatin as a suspension stabilizer in ethylenic suspension polymerization of vinyl chloride and other resins is not new, prior use of gelatin, with or without various so-called "secondary dispersants" has revealed in many instances that the same difficulties are encountered in producing a polymer having the desired properties as enumerated hereinbefore. In accordance with the present invention, these difficulties are overcome by combining with the gelatin at least one of the organic substituted phosphorus compounds indicated above.

Gelatin as used commercially is usually available in three different forms, including an acid-hydrolyzed gelatin having an isoelectric pH of about 4.8 to 5, an alkali-hydrolyzed gelatin having an isoelectric pH from about 7 to 8.2, and a non-ionized gelatin having an isoelectric pH of about 4.7. Although any of these forms of gelatin may be used, particularly good results have been obtained with the alkali-hydrolyzed form, which is preferred.

In the practice of the present invention, small quantities of gelatin, at least one phosphorus compound, and a peroxy polymerization catalyst are combined with larger quantities of water and the desired monomer, such as vinyl chloride and thoroughly agitated to form a suspension. Polymerization may be carried out in any suitable reactor, such as a glass-lined pressure vessel. The reactor is heated slowly, with continuing agitation, until the desired reaction temperature is attained, which is then maintained at this temperature until polymerization is complete.

The temperature at which the polymerization is carried out is not extremely critical and good results have been obtained using temperatures within the range of about 105° to 160° F. Excellent results, however, have been obtained using temperatures between 120° and 130° F. and this is, in most instances, the preferred temperature range. Since the reactor is closed during the polymerization, the reaction takes place under pressure. The completion of the reaction, i.e., when the polymerization is about 80% complete, is indicated by a sharp drop in pressure in the reactor of between 2 and 5 pounds per square inch. When this occurs, the reactor is cooled, generally via a water jacket, and the polymer removed and washed.

The invention is not restricted to the use of any particular catalyst. Accordingly, suitable polymerization catalysts can be employed, such as benzoyl peroxide, lauroyl peroxide, dicaproyl peroxide, acetyl benzoyl peroxide, diacetyl peroxide, p-tertiary-butyl perbenzoate, tertiary butyl perlaurate, ditertiary-butyl peroxide, as well as organic azo compounds such as alpha, alpha'-azodiisobutyrnitrilio and dimethyl alpha, alpha'-azodiisobutyrate. Excellent results, however, have been obtained when using lauroyl peroxide which is the preferred catalyst. The amount of catalyst used may vary generally within the range from about 0.10 to 0.40% by weight of monomer, especially within the range from about 0.15 to 0.25% by weight of monomer used, with the specifically preferred range being from about 0.16 to 0.18% by weight of monomer.

The amount of gelatin used varies depending on the type of phosphorus additive used. However, in general, the quantity of gelatin to be used can be employed in an amount within the range from about 0.10 to 0.45% by weight of monomer and preferably varies between about 0.15 to 0.35% by weight of monomer. The amount of phosphorus additive generally varies between about 0.1 to 0.5% by weight of monomer. When di-2-ethyl hexyl hydrogen phosphite is used, excellent results are obtained by using a gelatin concentration of about 0.1 to 0.2% by weight of monomer and a phosphite concentration of about 0.3 to 0.4% by weight of monomer. When bis-(2-ethyl hexyl)-2-ethyl hexyl phosphonate is employed as the phosphorus additive, excellent results are obtained using a concentration of about 0.15% gelatin and about 0.20% phosphonate and 0.20% gelatin with 0.50% phosphonate and amounts within the limits defined by such quantities, all percentages being by weight of monomer. The combination of di-2-ethyl hexyl phosphonate with the following in the indicated concentrations give excellent results: 0.15% gelatin with 0.10% phosphite and 0.10% phosphonate and 0.30% gelatin with from 0.10 to 0.20% phosphonate and 0.20% phosphate, all percentages being by weight of monomer.

The water to monomer volume ratio in the system generally is not critical and may vary from about 1.75 to 4:1. The preferred volume ratio, however, is about 1.90 to 2.25 volume water to 1 volume of monomer.

In order that those skilled in the art may better understand the invention and a method by which the same may be carried into effect, the following specific examples are offered:

*Example I*

100 grams of vinyl chloride monomer, 0.16 gram of Alperox (lauroyl peroxide), 300 ml. of water, 0.15 gram of alkali-hydrolyzed gelatin and 0.40 gm. of di-2-ethyl hexyl hydrogen phosphite are charged into a glass-lined reactor. The reactor is closed and brought to a temperature of about 125° F. over a period of two hours, while the contents are stirred constantly by an agitator rotating at 184 r.p.m. This temperature and agitation are maintained for a total reaction time of 15½ hours. The reactor is then cooled and the polymer centrifuged, washed and dried whereupon it is a finished material ready for processing. The thus-obtained polymer exhibits excellent colloidability and plasticizer absorption as well as extremely good heat stability and color.

*Example II*

The same materials used in Example I are combined in the same manner with the exception that 0.20 gm. of bis-(2-ethyl hexyl)-2-ethyl hexyl phosphonate is substituted for the 0.40 gm. of di-2-ethyl hexyl hydrogen phosphite. Otherwise the procedure followed is the same as that in Example I, with the further exception that a reaction time of 17 hours and 15 minutes is used. The thus-formed polymer has uniform size particles falling within a range of 100 to 200 mesh, and exhibits good colloidability and plasticizer absorption as well as excellent heat stability.

*Example III*

The same materials used as in Example I are again combined in the same manner with the exception that a mixture of 0.10 gm. of di-2-ethyl hexyl hydrogen phosphite and 0.10 gm. of bis-(2-ethyl hexyl)-2-ethyl hexyl phosphonate are substituted for the 0.40 gm. of di-2-ethyl hexyl hydrogen phosphite. Otherwise the procedure followed is the same as that in Example I with the further exception that the reaction time is 16 hours and 45 minutes. 90% of the particles of the thus-obtained polymer are between 100 and 200 mesh in size, and exhibit good colloidability and plasticizer absorption as well as excellent heat stability.

It has been found in another embodiment of the invention that the particle size of the polymer produced may be reduced and a more uniform particle will result which polymer has good colloidability, plasticizer absorption and heat stability, if air and/or an additional minor amount of gelatin is added during the polymerization. The amount of gelatin added typically is approximately 0.10% by weight of the monomer used, although amounts up to about 0.20% can be employed. With the addition both of air and gelatin, however, it is necessary that the addition be made within the first two hours of the reaction or there will be little or no desirable change in particle size.

It can thus be seen that by the method of this invention, an excellent polymer may be produced via suspenison polymerization using a gelatin as a suspending agent and employing at least one of the indicated types of organic phosphorus compounds in the suspension system. The polymers thus produced have superior colloidability, plasticizer absorption and heat stabilization as well as the ability to form products which are relatively free from the defects known as "fish eyes."

It is to be understood that although the invention has been described with specific reference to particular embodiments thereof, it is not to be so limited, since changes and alterations therein may be made which are within the full intended scope of this invention as defined by the appended claims.

What is claimed is:

1. A process for producing high quality polymer which comprises suspending a vinyl halide monomer in water with the aid of about 0.10% to about 0.45% of gelatin as a suspending agent and about 0.1% to about 0.5% of an aliphatic organic phosphorous compound selected from the group consisting of organic phosphonates, organic phosphites and phosphinic acids, the said percentages being by weight of the monomer, and polymerizing said monomer in a suspension which rapidly settles when agitation is discontinued.

2. A process for producing high quality polymer comprising suspending a vinyl halide monomer in water with the aid of about 0.10% to about 0.45% of gelatin and about 0.1% to about 0.5% of an aliphatic organic phosphorous compound, selected from the group consisting of organic phosphonates, organic phosphites and phosphinic acids, the percentages being by weight of monomer and polymerizing said monomer in a suspension which rapidly settles when agitation is discontinued, with the aid of heat and a polymerization catalyst selected from the group consisting of peroxy catalyst and organic azo compound catalyst.

3. A process as claimed in claim 2 in which the quantity of gelatin is about 0.15% and the quantity of the aliphatic organic phosphorous material is about 0.40%, both percentages being by weight of monomer.

4. A process as claimed in claim 3 in which the aliphatic organic phosphorous material is di-2-ethyl hexyl hydrogen phosphite.

5. A process as claimed in claim 2 in which the quantity of the aliphatic organic phosphorous material is about 0.20% by weight of the monomer.

6. A process as claimed in claim 2 in which the aliphatic organic phosphorous material is bis-(2-ethyl hexyl)-2-ethyl hexyl phosphonate.

7. A process as claimed in claim 2 in which the aliphatic organic phosphorous material is a mixture of di-2-ethyl hexyl hydrogen phosphite and bis-(2-ethyl hexyl)-2-ethyl hexyl phosphonate.

8. A process as claimed in claim 7 in which about equal quantities of di-2-ethyl hexyl hydrogen phosphite and bis-(2-ethyl hexyl)-2-ethyl hexyl phosphonate are used.

9. A process as claimed in claim 2 in which a quantity of air is introduced into the polymerization reactor during the initial stages of polymerization.

10. A process for producing high quality polyvinyl chloride comprising dispersing vinyl chloride monomer in water with the aid of about 0.15% to about 0.35% of gelatin as a suspending agent and about 0.1% to about 0.5% of an aliphatic organic phosphorous compound selected from the group consisting of organic phosphonates, organic phosphites and phosphinic acids, the percentages being by weight of monomer and polymerizing the monomer in a suspension which will settle rapidly upon discontinuance of agitation with the aid of heat and a polymerization catalyst selected from the group consisting of peroxy catalyst and organic azo compound catalyst.

References Cited in the file of this patent

UNITED STATES PATENTS

| | | |
|---|---|---|
| 2,194,354 | Crawford | Mar. 19, 1940 |
| 2,470,910 | Baer | May 24, 1949 |
| 2,576,720 | Marks | Nov. 27, 1951 |
| 2,833,754 | Richards et al. | May 6, 1958 |
| 2,836,585 | Hill | May 27, 1958 |